3,784,652
INDENYLPHOSPHONATES

Jerome A. Gourse, Chicago, Ill., assignor to Velsicol Chemical Corporation, Chicago, Ill.
No Drawing. Filed Apr. 19, 1972, Ser. No. 245,631
Int. Cl. C07f 9/40
U.S. Cl. 260—956        6 Claims

ABSTRACT OF THE DISCLOSURE

This invention discloses new chemical compounds of the formula

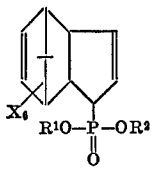
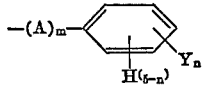

wherein X is halogen; and $R^1$ and $R^2$ are independently selected from the group consisting of alkyl and

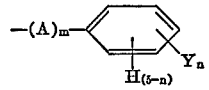

wherein A is an alkylene group of up to 4 carbon atoms; $m$ is an integer from 0 to 1; Y is halogen or alkyl; and $n$ is an integer from 0 to 5. The compounds of the above description are useful as fire retardants.

---

This invention relates to new compositions of matter and more specifically relates to new chemical compounds of the formula

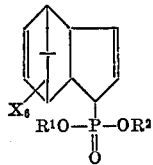
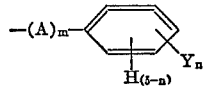
(I)

wherein X is halogen; and $R^1$ and $R^2$ are independently selected from the group consisting of alkyl and

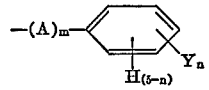

wherein A is an alkylene group of up to 4 carbon atoms; $m$ is an integer from 0 to 1; Y is halogen or alkyl; and $n$ is an integer from 0 to 5.

The compounds of the present invention are useful as fire retardants.

In a preferred embodiment of the present invention X is chlorine or bromine; and $R^1$ and $R^2$ are independently selected from the group consisting of lower alkyl and

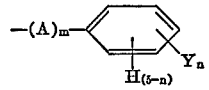

wherein A is an alkylene group of up to 4 carbon atoms; $m$ is an integer from 0 to 1; Y is chlorine, bromine or lower alkyl; and $n$ is an integer from 0 to 3.

The term lower as used herein designates a straight or branched carbon chain of up to six carbon atoms.

The compounds of this invention can be readily prepared from a bromoindene of the formula

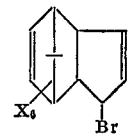
(II)

wherein X is as hereinabove described, by reaction with at least an equimolar amount of a phosphite of the formula

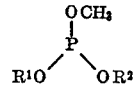
(III)

wherein $R^1$ and $R^2$ are as heretofore described. This reaction can be effected by charging the reactants into a suitable reaction vessel equipped with a reflux condenser, gas inlet tube and heating and stirring means. An inert gas atmosphere is then provided over the reaction mixture and the mixture is heated at a temperature ranging from about 100° C. to the reflux temperature of the mixture for a period of about 1 to about 8 hours. After this time the reaction mixture can be cooled to yield the desired product which can be used as such or can be further purified by conventional techniques such as washing, recrystallizing or triturating if the product is a solid or by extraction, distillation or the like if the product is an oil.

When $R^1$ and $R^2$ of the compounds of the present invention are alkyl and the same then these compounds can also be prepared by reacting the indene of Formula II with a symmetrical phosphite of the formula

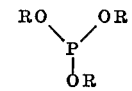
(IV)

wherein each R is the same alkyl group. This reaction can be effected by the procedures described above.

Exemplary haloindenes useful for preparing the compounds of the instant invention are 1-bromo-4,5,6,7,8,8-hexachloro - 3a,4,7,7a - tetrahydro-4,7-methanoindene,
1,4,5,6,7,8,8-heptabromo-3a,4,7,7a-tetrahydro-4,7-methanoindene,
1,8,8-tribromo-4,5,6,7-tetrachloro-3a,4,7,7a-tetrahydro-4,7-methanoindene,
1,4,5,6,7-pentabromo-8,8-dichloro-3a,4,7,7a-tetrahydro-4,7-methanoindene and the like.

Exemplary phosphites of Formulae III and IV useful in preparing the compounds of this invention are trimethyl phosphite, triethyl phosphite, tripropyl phosphite, tributyl phosphite, tripentyl phosphite, trihexyl phosphite, dimethyl ethyl phosphite, dimethyl propyl phosphite, dimethyl butyl phosphite, methyl ethyl propyl phosphite, methyl propyl butyl phosphite, dimethyl phenyl phosphite, dimethyl benzyl phosphite, methyl diphenyl phosphite, dimethyl 2-methyl-4-chlorophenyl phosphite, dimethyl, 3,4-dibromophenyl phosphite, dimethyl δ-(4-t-butylphenyl)-n-butyl phosphite and the like.

The manner in which the compounds of the present invention can be prepared is more specifically illustrated in the following examples.

EXAMPLE 1

Preparation of O,O-dimethyl 4,5,6,7,8,8-hexachloro-3a,4,7,7a-tetrahydro - 4,7 - methanoinden-1-ylphosphonate 1-bromo - 4,5,6,7,8,8 - hexachloro-3a,4,7,7,7a-tetrahydro-4,7-methanoindene (84 grams) and trimethyl phosphite (75 grams) were charged into a glass reaction vessel equipped with a mechanical stirrer, thermometer, gas inlet tube and reflux condenser. A nitrogen atmosphere was provided over the reaction mixture and the mixture was heated at reflux for a period of two hours. After this time the reaction mixture was cooled to room temperature to yield a solid product. Hexane was added to the product and the mixture was heated at reflux but the product did not dissolve. The solid product was then recovered by filtration and was recrystallized from methanol to yield the desired product O,O-dimethyl 4,5,6,7,8,8-hexachloro-3a,4,7,7a-tetrahydro - 4,7 - methanoinden-1-ylphosphonate having a melting point of 162 to 166° C.

EXAMPLE 2

Preparation of O,O-diethyl 4,5,6,7,8,8-hexachloro-3a,4,7,7a-tetrahydro-4,7-methanoinden-1-ylphosphonate 1-bromo - 4,5,6,7,8,8 - hexachloro-3a,4,7,7a-tetrahydro-4,7-methanoindene (42 grams) and triethyl phosphite (55 grams) were charged into a glass reaction vessel equipped with a mechanical stirrer, thermometer, gas inlet tube and reflux condenser. A nitrogen atmosphere was provided over the reaction mixture and the mixture was heated at reflux for a period of about 4 hours. After this time the reaction mixture was stripped of unreacted triethyl phosphite by distillation under vacuum. The residue was dissolved in pentane and was passed through a column of florex by elution with pentane and a pentaneether mixture. Twelve separate fractions were collected and fraction 2 to 11 were combined, stripped of solvent and recrystallized from hexane to yield the desired product O,O-diethyl 4,5,6,7,8,8-hexachloro - 3a,4,7,7a - tetrahydro-4,7-methanoinden-1-ylphosphonate having a melting point of 62 to 65° C.

EXAMPLE 3

Preparation of O,O-dibutyl 4,5,6,7,8,8-hexachloro-3a,4,7,7a-tetrahydro-4,7-methanoinden-1-ylphosphonate 1-bromo - 4,5,6,7,8,8 - hexachloro-3a,4,7,7a-tetrahydro-4,7-methanoindene (42 grams) and tributyl phosphite (40 grams) were charged into a glass reaction vessel equipped with a mechanical stirrer, thermometer, gas inlet tube and reflux condenser. A nitrogen atmosphere was provided over the reaction mixture and the mixture was heated at reflux for a period of about 4 hours. After this time the reaction mixture was cooled to room temperature and dissolved in methanol. The methanol solution was permitted to stand but no crystallization took place. The solution was then stripped of methanol and the residue was dissolved in pentane and the resulting solution was passed through a florex column by eluting with pentane, a pentane-ether mixture and with ether. Seven fractions were collected. Fractions 1 to 5 were combined and were stripped of solvent under vacuum to yield the desired product O,O-dibutyl 4,5,6,7,8,8-hexachloro-3a,4,7,7a-tetrahydro-4,7-methanoindene-1-ylphosphonate as an oil.

Other compounds within the scope of the present invention can be prepared by the procedures detailed in the foregoing examples. In the following examples are given the essential starting materials to prepare the indicated named compounds by the methods heretofore described.

EXAMPLE 4

1,4,5,6,7,8,8-heptabromo - 3a,4,7,7a - tetrahydro-4,7-methanoindene+methyl dihexyl phosphite=O,O-dihexyl 4,5,6,7,8,8-hexabromo-3a,4,7,7-tetrahydro - 4,7 - methanoinden-1-ylphosphonate.

EXAMPLE 5

1,8,8-tribromo - 4,5,6,7 - tertachloro-3a,4,7,7a-tetrahydro-4,7-methanoindene+methyl diphenyl phosphite=O,O-diphenyl 4,5,6,7-tetrachloro - 8,8 - dibromo-3a,4,7,7a-tetrahydro-4,7-methanoinden-1-ylphosphonate.

EXAMPLE 6

1,4,5,6,7-pentabromo - 8,8 - dichloro-3a,4,7,7a-tetrahydro-4,7-methanoindene+dimethyl 3,4 - dichlorophenylphosphite=O-methyl O-(3,4-dichlorophenyl) 4,5,6,7-tetrabromo - 8,8 - dichloro - 3a,4,7,7a - tetrahydro-4,7-methanoinden-1-ylphosphonate.

EXAMPLE 7

1-bromo-4,5,6,7,8,8-hexachloro - 3a,4,7,7a - tetrahydro-4,7-methanoindene+dimethyl 3-methylbenzyl phosphite= O-methyl O-(3-methylbenzyl) 4,5,6,7,8,8 - hexachloro-3a,4,7,7a-tetrahydro-4,7-methanoinden-1-ylphosphonate.

EXAMPLE 8

1-bromo-4,5,6,7,8,8 - hexachloro-3a,4,7,7a - tetrahydro-4,7 - methanoindene+dimethyl δ-(4-bromophenyl) - butyl phosphite=O-methyl O-[δ-(4 - bromophenyl)butyl]4,5,6,7,8,8-hexachloro-3a,4,7,7a-tetrahydro-4,7 - methanoinden-1-ylphosphonate.

EXAMPLE 9

1-bromo - 4,5,6,7,8,8-hexachloro - 3a,4,7,7a -tetrahydro-4,7-methanoindene+dimethyl 4 - t - butylphenyl phosphite=O - methyl O - (4-t - butylphenyl) 4,5,6,7,8,8-hexachloro-3a,4,7,7a - tetrahydro-4,7 - methanoinden - 1-ylphosphonate.

EXAMPLE 10

1-bromo - 4,5,6,7,8,8-hexachloro-3a,4,7,7a-tetra-hydro-4,7-methanoindene+methyl propyl 4-hexylphenyl phosphite=O - propyl O - (4-hexylphenyl) 4,5,6,7,8,8-hexachloro-3a,4,7,7a - tetrahydro - 4,7 - methanoinden - 1-ylphosphonate.

EXAMPLE 11

1-bromo - 4,5,6,7,8,8 - hexachloro - 3a,4,7,7a - tetrahydro - 4,7 - methanoindene+dimethyl 2,4,5-tribromophenyl phosphite=O-methyl O - (2,4,5 - tribromophenyl) 4,5,6,7,8,8-hexachloro-3a,4,7,7a - tetrahydro - 4,7 - methanoinden-1-ylphosphonate.

EXAMPLE 12

1,4,5,6,7,8,8 - heptabromo-3a,4,7,7a - tetrahydro - 4,7-methanoindene+trimethyl phosphite=O,O - dimethyl 4,5,6,7,8,8-hexabromo - 3a,4,7,7a - tetrahydro - 4,7-methanoinden-1-ylphosphonate.

EXAMPLE 13

1,4,5,6,7,8,8-heptabromo-3a,4,7,7a - tetrahydro - 4,7-methanoindene+triethyl phosphite=O,O - diethyl 4,5,6,7,8,8 - hexabromo - 3a,4,7,7a - tetrahydro - 4,7 - methanoinden-1-ylphosphonate.

The compounds of this invention impart fire retardant properties to combustible polymers by forming an intimate admixture therewith. Thus, a further embodiment of the present invention resides in a fire retardant polymeric composition comprising a combustible polymer and a compound of this invention. The fire retardant polymeric compositions can be readily prepared by one of several methods well known in the art. For example, the compounds of this invention can be admixed into the combustible polymer while the latter is dissolved in a suitable solvent. This procedure is especially useful when it is desired to mix the halogenated compounds during the preparation for the polymer. The compounds of this invention can also be mixed with the combustible polymer in the molten state at a temperature that can range from the melting point of the polymer to a temperature just below the decomposition temperature of the polymer. Another method of forming an intimate admixture comprises dry blending the compounds with the polymer in the finely divided state. Subsequent molding or extrusion of this blend can then result in a substantially homogenous composition.

The fire retardant polymeric compositions of the instant prene,invention can contain from about 5 to about 50 weight percent of a compound of this invention. The exact amount of compound employed will depend upon such factors as the degree of fire retardancy desired, the specific combustible polymer used, the end use of the resulting product and the like.

Exemplary of combustible polymers which can be used in admixture with the compounds of this invention to form the fire retardant polymeric compositions are the homopolymers and copolymers of unsaturated aliphatic, cycloaliphatic and aromatic hydrocarbons, such as polyethylene, polypropylene, polybutene, ethylene propylene copolymers, copolymers of ethylene or propylene with other olefins, polybutadiene, polymers of butadiene, polyisoprene, polystyrene, polyvinylidene, and polymers of pentene, hexene, heptene, octene, 2-methylpropene-1, 3-methylbutene-1, 4-methylpentene-1, 4-methylhexene-1, 5-methylhexene-1,bicyclohexene 2.2.1, pentadiene, hexadiene, 2,3-dimethylbutadiene-1,3, 2-methyl-pentadiene, vinylcyclohexene such as 4-vinylcyclohexene, cyclopentadiene, methylstyrene and the like. Other useful polymers include indene-coumarone resins, polymers of acrylate esters and polymers of methacrylate esters, acrylate and methacrylate resins such as ethyl acrylate, n-butyl methacrylate, isobutyl methacrylate, ethyl methacrylate, and methyl methacrylate, alkyd resins, hydrocarbon resins from petroleum, isobutylene resins, polyurethanes, polyester resins such as unsaturated polyesters of dibasic acids and dihydroxy compounds, polyester elastomers, polyisobutylene, rubbers such as natural rubber, synthetic polyisoprene, chlorinated rubber, polybutadiene, cyclized rubber, butadiene-acrylonitrile rubber, butadiene-styrene rubber, butyl rubber, neoprene rubber, polystyrene, terpene resins, urea resins, vinyl resins such as poly(vinyl acetal), poly(vinyl acetate), vinyl alcohol-acetate copolymer, poly(vinyl alcohol), poly(vinyl alkyl ether), vinyl methyl ether maleic anhydride copolymer, poly(vinyl chloride), poly(vinyl butyral), vinyl chloride-acetate copolymer, poly(vinyl pyrrolidone) vinylidene chloride copolymers and the like. Additional useful polymers include nylon, diallyl phthalates and phthalate resins and polycarbonates.

The fire retardant composition of this invention can also contain adjuvants which in conjunction with the compounds of this invention improve the fire retardancy of the composition and in some instances provide synergistic results not obtainable with the use of the compounds alone. Such adjuvants can comprise antimony compounds such as antimony trioxide, zinc borate, lead arsenates such as PbHAsO₄ and the like. These adjuvants can comprise from about 1 to about 35% by weight of the total composition.

The effectiveness of the compounds of this invention as flame retardants can be demonstrated in experiments wherein fire retardant compositions comprising the compounds of the present invention and various combustible polymers are subjected to a flammability test using the oxygen index method. The flammability test can be carried out in accordance with the general procedures detailed in the ASTM D 2863-70 test method. This method provides a procedure for determining the relative flammability of plastics by measuring the minimum concentration of oxygen expressed as volume percent, in a slowly rising mixture of oxygen and nitrogen that will just support combustion. Exemplary polymeric fire retardant compositions are set forth in the following examples.

|  | Composition, parts by weight |
|---|---|
| Example 14: | |
| Product of Example 1 | 20 |
| Polyethylene | 70 |
| Antimony trioxide | 10 |
| Example 15: | |
| Product of Example 2 | 40 |
| Polystyrene | 60 |
| Example 16: | |
| Product of Example 3 | 40 |
| ABS* | 60 |
| Example 17: | |
| Polystyrene | 80 |
| Product of Example 1 | 12 |
| Antimony trioxide | 5 |
| Zinc borate | 3 |

*ABS=a terepolymer of acrylonitrile, butadiene and styrene.

I claim:
1. A compound of the formula

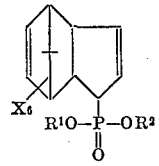

wherein X is chlorine or bromine; and R¹ and R² are independently selected from the group consisting of lower alkyl and

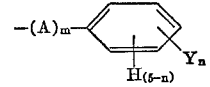

wherein A is an alkylene group of up to 4 carbon atoms; m is an integer from 0 to 1; Y is selected from the group consisting of chlorine, bromine and lower alkyl; and n is an integer from 0 to 5.

2. The compound of claim 1, O,O-dimethyl 4,5,6,7,8,8-hexachloro - 3a,4,7,7a - tetrahydro - 4,7 - methanoinden-1-ylphosphonate.

3. The compound of claim 1, O,O-diethyl 4,5,6,7,8,8-hexachloro - 3a,4,7,7a - tetrahydro - 4,7 - methanoinden-1-ylphosphonate.

4. The compound of claim 1, O,O-dibutyl 4,5,6,7,8,8-hexachloro - 3a,4,7,7a - tetrahydro - 4,7 - methanoinden-1-ylphosphonate.

5. The compound of claim 1, O,O-dimethyl 4,5,6,7,8,8-hexabromo - 3a,4,7,7a - tetrahydro - 4,7 - methanoinden-1-ylphosphonate.

6. The compound of claim 1, O,O-diethyl 4,5,6,7,8,8-hexabromo - 3a,4,7,7a - tetrahydro - 4,7 - methanoinden-1-ylphosphonate.

References Cited

UNITED STATES PATENTS 2,622,096   12/1952   Ladd _____ 260—956
2,881,196   4/1959   Fields _____ 260—956 X LEWIS GOTTS, Primary Examiner R. L. RAYMOND, Assistant Examiner U.S. Cl. X.R.

260—45.7 P, 45.75 R, 969